A. N. GOULDH.
TWIN ROTARY HARROW.
APPLICATION FILED MAR. 3, 1915.
1,145,240.
Patented July 6, 1915.
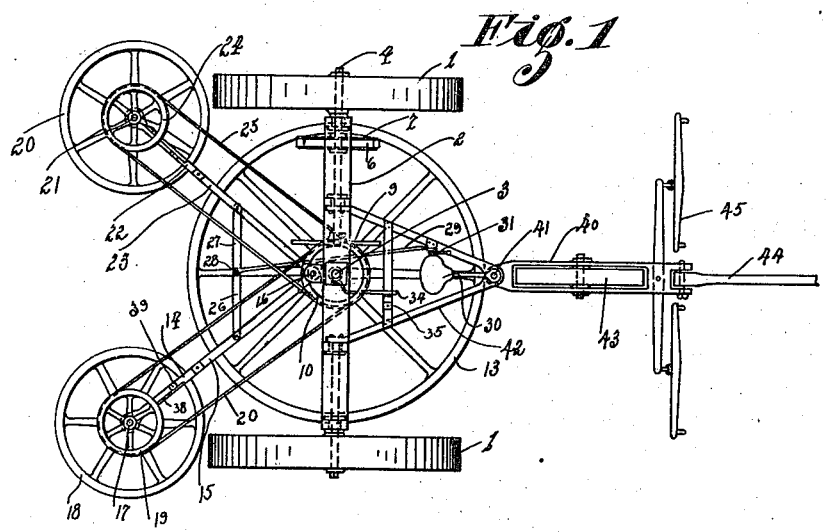
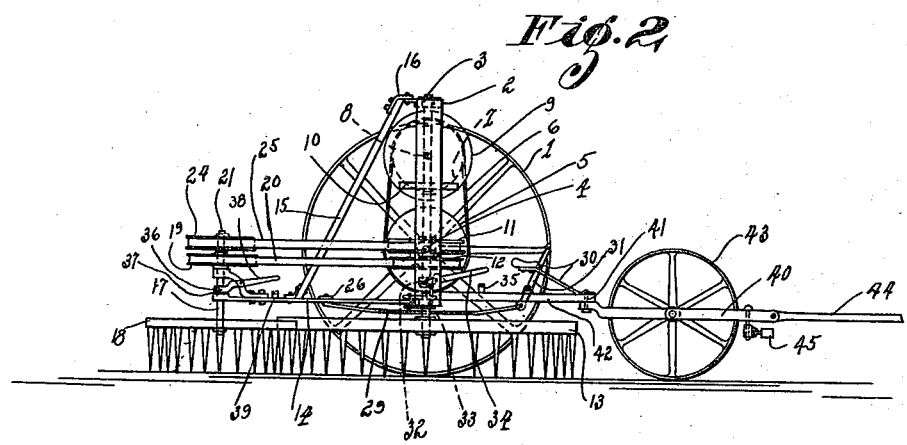
WITNESSES:
S. N. Blewett
F. M. Blanchard
INVENTOR.
Andrew N. Gouldh
BY
Seray S. Webster
ATTORNEY

UNITED STATES PATENT OFFICE.

ANDREW N. GOULDH, OF LODI, CALIFORNIA.

TWIN ROTARY HARROW.

1,145,240.

Specification of Letters Patent.

Patented July 6, 1915.

Application filed March 3, 1915. Serial No. 11,721.

*To all whom it may concern:*

Be it known that I, ANDREW N. GOULDH, a subject of the Kingdom of Sweden, residing at Lodi, in the county of San Joaquin, State of California, have invented certain new and useful Improvements in Twin Rotary Harrows; and I do declare the following to be a full, clear, and exact description of the same, reference being had to the accompanying drawings, and to the characters of reference marked thereon, which form a part of this application.

This invention relates to improvements in farming implements and particularly to harrows and to the rotary type thereof, the object of the invention being to produce a main wheeled rotary harrow provided with a pair of twin auxiliary rotary harrows adapted to project beyond the sides of the main rotary harrow and behind and beyond the supporting wheels of the main rotary harrow whereby they may operate in close relation to and between the vines and trees around which the soil may be cultivated. The aim of the invention is to provide these twin auxiliary harrows so that this close cultivation may be had adjacent the vines or trees, the same being so operated and positioned however that whenever there is danger of their striking or coming into contact with a vine or tree they may be retracted toward the longitudinal center line of the vehicle so as to be removed from danger of such contact and then when desired they may be thrown into normal operating position.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a top plan view of the complete structure. Fig. 2 is a side elevation of the device with one wheel removed to show the interior structure.

Referring now more particularly to the characters of reference on the drawings, the numeral 1 designatess the main supporting wheels of the device mounted between which is an arched supporting frame 2. Journaled centrally of this arched supporting frame 2 is a shaft 3. The axle 4 of one of the wheels 1 projects within the frame 2 and is provided with a pulley 5 connected by a belt 6 to a pulley 7 mounted on a shaft 8 journaled in the frame 2. On the shaft 8 is a friction disk 9 engaging the friction disk 10 mounted on the shaft 3. Fixed on the shaft 3 are two pulleys 11 and 12 and fixed on the lower end of the shaft 3 is a large main rotary harrow 13. Hinged on the frame 2 at the lower end is a projecting beam 14 having an inclined supporting beam 15 fixed thereto, such beam 15 being hinged at its upper end as at 16 to the frame 2, whereby the frame 14—15 may be swung in different directions relative to the frame 2. In the outer end of the beam 14 is suitably journaled a small shaft 17 fixed to which is a small rotary harrow 18. On the upper end of the shaft 17 is a pulley 19 connected by a belt 20 with the pulley 12. The position of the harrow 14 is normally to the rear and outside of the plane of one of the wheels 1. I likewise provide another small rotary harrow 20 similarly normally positioned behind the other wheel 1 and secured on a shaft 21 mounted in a frame 22—23 of the same structure as the frame 14—15, and on the upper end of the shaft 21 is a pulley 24 connected by a belt 25 with the pulley 11. With the forward movement of the wheels 1 the axle 4 is driven to operate the pulley 5 which through the medium of the belt 6 operates the pulley 7 and the shaft 8 driving the friction disk 9. This in turn drives the disk 10 and incidentally the shaft 3. With this movement of the shaft 3 the large rotary harrow 13 is turned and through the medium of the pulleys 11 and 12 and their connections the harrows 18 and 20 are likewise revolved. Thus with the movement of the device, the main harrowing operation is performed by the large harrow 13 and the small twin harrows 18 and 20 cultivate along the edges and close into the vines or trees between the rows.

When it is desired to move the harrow 18 or 20 to avoid coming into contact with vines or trees, the two frames 14—15 and 22—23 are simultaneously swung inwardly toward the longitudinal center line of the device by means of the following structure, namely: A link 26 is connected with the member 14, and a link 27 is connected with the member 22, and these links are pivotally connected together, as at 28, and at the point 28 a rod 29 is pivotally connected to both links and projects to a point adjacent the seat 30 of the driver of the vehicle, where it is connected with a lever 31 suitably fulcrumed and projecting into easy reach of the driver occupying the seat 30. Hence by operating the lever 30 the links 26 and 27 may be folded in toward each other, which action, will pull the frames 14—15 and 22—23 inwardly toward each other and incidentally move the harrows 18 and 20 toward the longitudinal center line of the device and out of the way and out of danger of coming into contact with undesired objects such as vines or trees. Then when they are to be returned to normal position the lever 30 is operated to reverse the movement and throw them outward again.

To raise the harrow 13 out of engagement with the soil, I provide a slotted collar 32 fixed to the shaft 3 engageable by a yoke 33 on a lever 34 suitably fulcrumed. By operating the lever 34 this will, through the medium of the yoke 33 and collar 32, lift the shaft 3 which is movable therein for the purpose, and incidentally the harrow 13, and this position may be maintained by forcing the lever 33 under a retaining catch 35. Similarly each of the harrows 18 and 20 may be raised by means of a slotted collar 36 fixed to their respective shafts and engageable by a yoke 37 on a lever 38. Also the harrows 18 or 20 may be held in lifted position by engaging the lever 38 under a retaining catch 39. For purposes of convenience in operating, and for the purpose of aiding and supporting the driver, I provide a small pilot frame 40, hinged as at 41, to a V-shaped frame 42 projecting forwardly from the frame 2, said frame 40 carrying a small pilot wheel 43 connected in advance of which are a tongue 44 and whiffle trees 45.

From the foregoing description it can be seen that I have produced a wheeled harrow which may be ridden on by the operator and which will very efficiently perform the functions for which it is designed. It will also be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A device of the character described comprising a wheel mounted frame, a main rotary harrow driven centrally of said frame, a pair of twin rotary harrows projecting to the rear and outside the plane of said main harrow, means for shifting the positions of said twin harrows and means for driving all of said harrows with the forward movement of the device, as described.

2. A device of the character described comprising a wheel mounted frame, a pair of swinging frames mounted on said wheel mounted frame, a rotary harrow disposed in the outer end of each swinging frame, a link secured to each swinging frame, said links being pivotally connected with each other, a lever, a rod connecting said links and said lever, and means for rotating said harrows, as described.

In testimony whereof I affix my signature in presence of two witnesses.

ANDREW N. GOULDH.

Witnesses:
STEPHEN N. BLEWETT,
FLOYD M. BLANCHARD.

Copies of this patent may be obtained for five cents each, by addressing the "Commissioner of Patents, Washington, D. C."